June 13, 1961     W. I. SHLANK     2,987,909
LOCKING COVER ASSEMBLY FOR ELECTRICAL WALL OUTLET BOXES
Filed Nov. 25, 1958
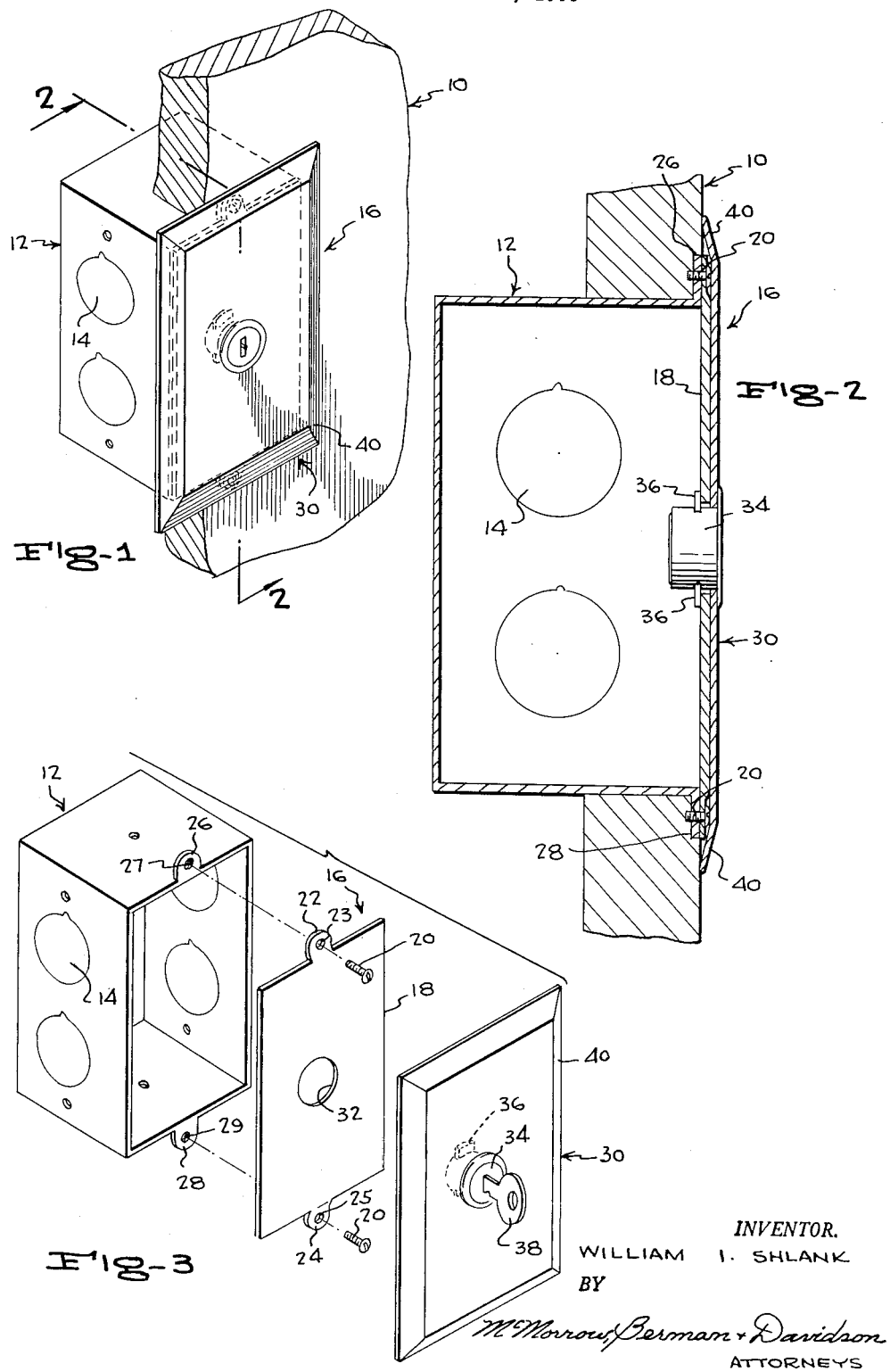
INVENTOR.
WILLIAM I. SHLANK
BY
McMorrow, Berman & Davidson
ATTORNEYS

United States Patent Office 2,987,909
Patented June 13, 1961

2,987,909
LOCKING COVER ASSEMBLY FOR ELECTRICAL WALL OUTLET BOXES
William I. Shlank, 174-B Highland St., New Haven, Conn.
Filed Nov. 25, 1958, Ser. No. 776,283
4 Claims. (Cl. 70—168)

The present invention relates to electrical wall outlet boxes generally and in particular to a locking cover assembly for such boxes.

Presently in use in multiple unit residential buildings are television signal systems having one or more distribution outlets in each suit of rooms connected in circuit with a master television antenna mounted on each building. Electrical wall outlet boxes are employed in the system with suitable lead-in wires and cables extending from the antenna to each outlet box. The expense of installation and maintenance of such a system is generally met by charging the tenant of each unit a subscription fee. In order that a nonsubscribing tenant be deterred from unauthorized use of the system, either the lead-in wires or cables must be removed from the outlet box or boxes in the particular suite of rooms, or means must be employed to lock the interior of the box or boxes against unauthorized entry thereinto and tampering with the contents of the box.

An object of the present invention is to provide a locking cover assembly which lends itself to ready installation for closing the open front of an outlet box and when installed is immune to removal by persons other than authorized parties.

Another object of the present invention is to provide a locking cover assembly which fixedly closes the open front of an outlet box and which is removable only by authorized parties.

A further object of the present invention is to provide a locking cover assembly which when installed over an open front of an outlet box shrouds the attaching means therefor and thereby eliminates the possibility of tampering by unauthorized persons.

A still further object of the present invention is to provide a locking cover assembly which when installed on an open front of an outlet box shrouds the attaching means therefor and which is removable only by authorized persons.

A still further object of the present invention is to provide a locking cover assembly for an electrical wall outlet box which is neat and attractive in appearance when installed over the open front of an electrical wall outlet box, which is economically feasible, and one which is highly effective in action.

These and other objects and advantages of the present invention will be fully apparent from the following description when taken in conjunction with the annexed drawing, in which:

FIGURE 1 is an isometric view of an electrical wall outlet box installed in a wall, with the locking cover assembly of the present invention installed over the open front of the box and with the box supported in a wall, portions of the wall being shown broken away;

FIGURE 2 is a view on an enlarged scale, taken on the line 2—2 of FIGURE 1; and

FIGURE 3 is an isometric exploded view of the locking cover assembly according to the present invention and an electrical wall outlet box, showing the relation of parts prior to assembly.

Referring in greater detail to the drawing in which like numerals indicate like parts throughout the several views, in FIGURES 1 and 2, the reference numeral 10 designates a wall such as is commonly employed in a multiple unit residential building. The reference numeral 12 designates generally an electrical wall outlet box of conventional construction, having an open front, spaced sides, a back, and tops and bottoms. The sides are provided with knockout portions 14 for attachment thereto of conventional conduit means which, in this case, may contain television lead-in wires or cables, neither the conduit means nor the cables or wires are shown as not being a part of the present invention.

The locking cover assembly according to the present invention is designated generally by the reference numeral 16 and comprises a face plate 18 conformably shaped to close the open front of the box 12.

Means is provide on the face plate 18 for reception of securing elements, or screws 20, to attach the face plate 18 in closing relation with respect to the open front of the box 12. This means consists in an ear 22 projecting upwardly from the upper end of the face plate 18 and another ear 24 projecting downwardly from the lower end of the face plate 18. The ears 22 and 24 are provided with openings 23 and 25 therethrough for the screws 20, the upper and lower ends of the open front of the box 12 being provided with similar ears 26 and 28 having threaded holes 27 and 29 therein for receiving the screws 20.

The present invention provides a cover plate 30 of an area to completely shroud the face plate 18 and the ears 22 and 24 of the face plate 18. The cover plate 30 is adapted to be mounted in face to face abutting relation with respect to the face plate 18 when the face plate 18 is affixedly secured to the open front of the box 12.

The face plate 18 is provided with a hole 32 centrally thereof. The present invention provides a key operable locking means carried by the cover plate 30 and projectable through the hole 32 in the face plate 18 and engageable with a nonconfronting face of the face plate 18 when the cover plate 30 is mounted in face to face abutting relation with respect to the face plate 18 and the face plate 18 is secured over the open front of the box 12. This locking means consists in a key operable cylinder lock 34 secured to the cover plate 30 in a position of registry with respect to the hole 32 in the face plate 18. The lock 34 is of a size to loosely slip through the hole 32 when the cover plate 30 is positioned, as in FIGURE 2, in confronting abutting face to face relation with respect to the face plate 18.

The cylinder lock 34 includes at least one latch element 36 normally in a retractile position and shiftable to an extensile position, as shown in FIGURE 2, so as to engage the nonconfronting face of the face plate 18 when the cover plate 30 is in the face to face abutting relation position with respect to the face plate 18.

Hand actuable means, embodying a key 38, is provided by the present invention and is operatively connected to the latch elements 36 for actuating the latter to the extensile position in engagement with a nonconfronting face of the face plate 18 when the cover plate 30 is in the face to face abutting relation position. The key 38 is insertable into and withdrawable from the lock 34 in the conventional manner.

Preferably, the cover plate 30 is provided on its perimeter with a beveled portion 40 adding to the attractiveness of the assembly when installed over the box 12 and completely sealing the perimeter of the face plate 18, as shown in FIGURE 2.

In use, the locking cover assembly of the present invention is primarily intended to cover the open front of an electrical wall outlet box employed as an outlet for signal wires or cables of a television signal system in a multiple unit residential building although it is also adaptable to cover the open front of an electrical wall outlet box employed for any other purpose. When it is desired to prevent unauthorized entry into the interior of the electrical wall outlet box 12, the face plate 18 is first secured to the open front of the box 12 with the screws 20 received in the openings 23 and 25 in the ears 22 and 24 of the face plate 18 and then threaded into the openings 27 and 29 in the ears 26 and 28 of the box 12. Next, the cover plate 30 is positioned in abutting face to face confronting relation with respect to the exterior face of the plate 18 and with the portion of the lock 34 on the confronting face of the cover plate 30 received in the hole 32 provided in the face plate 18. The latch elements 36 are next shifted to their extended positions in abutting engagement with the nonconfronting face of the face plate 18 and the key 38 is removed from the lock 34, securely supporting the cover plate 30 over the face plate 18 and covering the head portions of the screws 20 so that the latter may not be reached for removal of the face plate 18.

What is claimed is:

1. A locking cover assembly for covering the open front of electrical wall outlet boxes comprising a face plate conformably shaped to close said open front, means on said face plate for reception of securing elements to attach said face plate in closing relation with respect to said open front, a cover plate of an area to completely shroud said face plate and said means adapted to be mounted in face to face abutting relation with respect to said face plate when the latter is affixedly secured to the open front of an electrical wall outlet box, and a key operable locking means carried by said cover plate and projectable through said face plate and engageable with the nonconfronting face of said face plate when the cover plate is mounted in face to face abutting relation with respect to said face plate for retaining said cover plate in covering relation and protecting said face plate against tampering.

2. A locking cover assembly for covering the open front of electrical wall outlet boxes comprising a face plate conformably shaped to close said open front, means on said face plate for reception of securing elements to attach said face plate in closing relation with respect to said open front, a cover plate of an area to completely shroud said face plate and said means adapted to be mounted in face to face abutting relation with respect to said face plate when the latter is affixedly secured to the open front of an electrical wall outlet box, and a key operable cylinder lock including a latch element normally in a retractile position and shiftable to an extensile position carried by said cover plate and projectable through said face plate when the cover plate is mounted in face to face abutting relation with respect to said face plate, said latch element when shifted to the extensile position being in engagement with the non-confronting face of said face plate when the cover plate is in face to face abutting relation with respect to said face plate.

3. The combination with an electrical wall outlet box having an open front, of a locking cover assembly comprising a face plate conformably shaped to close said open front positioned in closing relation with respect to the open front of said box, securing elements extending through means provided in said face plate and securing said face plate in the closing relation position, a cover plate of an area to completely shroud said face plate and said securing elements mounted in face to face abutting relation with respect to said face plate, a key operable locking means carried by said cover plate and projectable through said face plate and engageable with the nonconfronting face of said face plate when the cover plate is mounted in face to face abutting relation with respect to said face plate for retaining said cover plate in covering relation and protecting said face plate against tampering.

4. The combination with an electrical wall outlet box having an open front, of a locking cover assembly comprising a face plate conformably shaped to close said open front positioned in closing relation with respect to the open front of said box, securing elements extending through means provided in said face plate and securing said face plate in the closing relation, a cover plate of an area to completely shroud said face plate and said securing elements mounted in face to face abutting relation with respect to said face plate, and a key operable cylinder lock including a latch element normally in a retractile position and shiftable to an extensile position carried by said cover plate and projectable through said face plate when the cover plate is mounted in face to face abutting relation with respect to said face plate, said latch element when shifted to the extensile position being in engagement with the nonconfronting face of said face plate when the cover plate is in face to face abutting relation with respect to said face plate.

References Cited in the file of this patent

UNITED STATES PATENTS

| | | |
|---|---|---|
| 1,187,534 | Kossoy | June 20, 1916 |
| 1,190,643 | Harris | July 11, 1916 |
| 1,713,101 | Starrett | May 14, 1929 |
| 2,297,862 | Bachmann | Oct. 6, 1942 |
| 2,399,016 | Gits | Apr. 23, 1946 |
| 2,493,366 | Simcich | Jan. 3, 1950 |
| 2,594,407 | Earnest | Apr. 29, 1952 |
| 2,603,546 | Lais | July 15, 1952 |
| 2,643,787 | Rockman | June 30, 1953 |
| 2,751,105 | Eipper | June 19, 1956 |